(12) United States Patent
Shao

(10) Patent No.: US 11,293,780 B2
(45) Date of Patent: *Apr. 5, 2022

(54) DATA TRANSMISSION METHOD FOR AN SMART GAS SERVICE SYSTEM BASED ON COMPOUND IOT

(71) Applicant: Chengdu Qinchuan IoT Technology Co., Ltd., Chengdu (CN)

(72) Inventor: Zehua Shao, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/990,749

(22) Filed: Aug. 11, 2020

(65) Prior Publication Data
US 2020/0370921 A1    Nov. 26, 2020

Related U.S. Application Data

(63) Continuation of application No. 16/362,612, filed on Mar. 23, 2019, now Pat. No. 10,809,092.

(51) Int. Cl.
| | |
|---|---|
| *G01D 4/00* | (2006.01) |
| *H04W 4/38* | (2018.01) |
| *H04W 4/70* | (2018.01) |
| *G06F 11/20* | (2006.01) |

(52) U.S. Cl.
CPC ......... *G01D 4/004* (2013.01); *G06F 11/2025* (2013.01); *H04W 4/38* (2018.02)

(58) Field of Classification Search
None
See application file for complete search history.

(56) References Cited

U.S. PATENT DOCUMENTS

| | | | |
|---|---|---|---|
| 2010/0026516 A1* | 2/2010 | Lazar | G01D 4/004 340/870.03 |
| 2018/0183685 A1* | 6/2018 | Cook | H04L 12/4641 |
| 2018/0332370 A1* | 11/2018 | Shao | H04Q 9/00 |
| 2019/0029074 A1* | 1/2019 | Inoue | H04L 69/08 |
| 2019/0124590 A1* | 4/2019 | Chiang | H04L 12/2838 |

* cited by examiner

*Primary Examiner* — Curtis A Kuntz
*Assistant Examiner* — Jerold B Murphy
(74) *Attorney, Agent, or Firm* — Getech Law LLC; Jun Ye

(57) ABSTRACT

The present invention provides a gas data transmission method based on a compound Internet of Things (IoT) and an IoT system. The method includes: sending, by a main sensor network sub-platform in a plurality of sensor network sub-platforms, gas data to a management platform; storing, by auxiliary sensor network sub-platforms, the gas data; when the management platform cannot receive the gas data sent by the main sensor network sub-platform, sending, by the management platform, interactive data to the main sensor network sub-platform; and when the main sensor network sub-platform does not respond to the interactive data, disconnecting, by the management platform, from the main sensor network sub-platform and establishing a connection with one auxiliary sensor network sub-platform to receive the gas data stored by the auxiliary sensor network sub-platform.

12 Claims, 3 Drawing Sheets

DATA TRANSMISSION METHOD FOR AN SMART GAS SERVICE SYSTEM BASED ON COMPOUND IOT

CROSS-REFERENCE TO RELATED APPLICATION

This application is a continuation of U.S. patent application Ser. No. 16/362,612, filed Mar. 23, 2019, the content of which application is hereby expressly incorporated herein by reference in its entirety.

TECHNICAL FIELD

The present invention relates to the field of Internet of Things (IoT), and in particular to a gas data transmission method based on a compound IoT and an IoT system.

BACKGROUND

At present, most families or enterprises start to use an intelligent gas meter to transmit gas data remotely. The existing intelligent gas meter transmits the data by using a separate gateway. When the gateway is damaged and is faulty, a background server cannot receive the data of the intelligent gas meter, which results in the loss of the data and is not beneficial to the statistics of the gas data.

SUMMARY OF THE INVENTION

In view of this, an objective of the present invention is to provide a gas data transmission method based on a compound IoT and an IoT system to guarantee the stability and reliability of the gas data transmission of a gas meter.

To this end, the technical solutions adopted by the present invention are as follows:

According to a first aspect, the present invention provides a gas data transmission method based on a compound IoT; the method is applied to an IoT system; the IoT system includes a user platform, a service platform, a management platform, a plurality of sensor network sub-platforms and an object platform; the object platform includes a gas meter; the plurality of sensor network sub-platforms include a main sensor network sub-platform and at least one auxiliary sensor network sub-platform; and the method comprises:

sending, by the object platform, collected gas data to the plurality of sensor network sub-platforms;

sending, by the main sensor network sub-platform, the gas data to the management platform;

storing, by the auxiliary sensor network sub-platforms, the gas data;

when the management platform cannot receive the gas data sent by the main sensor network sub-platform, sending, by the management platform, interactive data to the main sensor network sub-platform, and when the main sensor network sub-platform does not respond to the interactive data, disconnecting, by the management platform, from the main sensor network sub-platform and establishing a connection with one of the auxiliary sensor network sub-platforms; and sending, by an auxiliary sensor network sub-platform that establishes the connection with the management platform, the stored gas data to the management platform.

Further, each of the auxiliary sensor network sub-platforms stores the gas data for predetermined time and after the predetermined time, each of the auxiliary sensor network sub-platforms deletes the gas data.

Further, a cycle that each of the plurality of sensor network sub-platforms sends the gas data is the same, and the predetermined time is the cycle.

Further, the method includes: when the management platform cannot receive the gas data sent by the auxiliary sensor network sub-platform, sending, by the management platform, interactive data to the auxiliary sensor network sub-platform; and when the auxiliary sensor network sub-platform does not respond to the interactive data, disconnecting, by the management platform, from the auxiliary sensor network sub-platform and establishing a connection with one of the other auxiliary sensor network sub-platforms to obtain the gas data conveniently.

Further, the method includes:

sending, by the management platform, fault information of the main sensor network sub-platform to the service platform;

sending, by the service platform, the fault information to the user platform;

displaying, by the user platform, the fault information to prompt a user of the fault information; and after the fault information is removed, restoring, by the management platform, the communication with the main sensor network sub-platform.

According to a second aspect, the present invention provides an IoT system; the IoT system includes a user platform, a service platform, a management platform, a plurality of sensor network sub-platforms, and an object platform; the object platform is communicatively connected with the management platform via one of the plurality of sensor network sub-platforms; the management platform is communicatively connected with the service platform; the service platform is communicatively connected with the user platform; the object platform includes a gas meter; and the plurality of sensor network sub-platforms include a main sensor network sub-platform and at least one auxiliary sensor network sub-platform.

The object platform is configured to send collected gas data to the plurality of sensor network sub-platforms;

the main sensor network sub-platform is configured to send the gas data to the management platform;

the auxiliary sensor network sub-platforms are configured to store the gas data;

when the management platform cannot receive the gas data sent by the main sensor network sub-platform, the management platform sends interactive data to the main sensor network sub-platform;

when the main sensor network sub-platform does not respond to the interactive data, the management platform disconnects from the main sensor network sub-platform and establishes a connection with one of the auxiliary sensor network sub-platforms; and an auxiliary sensor network sub-platform that establishes the connection with the management platform sends the stored gas data to the management platform.

Further, each of the auxiliary sensor network sub-platforms is configured to store the gas data for predetermined time and after the predetermined time, each of the auxiliary sensor network sub-platforms deletes the gas data.

Further, a cycle that each of the plurality of sensor network sub-platforms sends the gas data is the same, and the predetermined time is the cycle.

Further, when the management platform cannot receive the gas data sent by the auxiliary sensor network sub-platform, the management platform sends interactive data to the auxiliary sensor network sub-platform; and when the auxiliary sensor network sub-platform does not respond to the interactive data, the management platform disconnects from the auxiliary sensor network sub-platform and establishes a connection with one of the other auxiliary sensor network sub-platforms to obtain the gas data conveniently.

Further, the management platform is configured to send fault information of the main sensor network sub-platform to the service platform;

the service platform is configured to send the fault information to the user platform;

the user platform is configured to display the fault information to prompt a user of the fault information; and after the fault information is removed, the management platform restores the communication with the main sensor network sub-platform.

The present invention provides a gas data transmission method based on a compound IoT and an IoT system. The method is applied to the IoT system. The IoT system includes a user platform, a service platform, a management platform, a plurality of sensor network sub-platforms, and an object platform; the object platform includes a gas meter; the plurality of sensor network sub-platforms include a main sensor network sub-platform and at least one auxiliary sensor network sub-platform; the main sensor network sub-platform in the plurality of sensor network sub-platforms is configured to send gas data to the management platform; the auxiliary sensor network sub-platforms are configured to store the gas data; when the management platform cannot receive the gas data sent by the main sensor network sub-platform, the management platform sends interactive data to the main sensor network sub-platform; and when the main sensor network sub-platform does not respond to the interactive data, the management platform disconnects from the main sensor network sub-platform and establishes a connection with one auxiliary sensor network sub-platform to receive the gas data stored by the auxiliary sensor network sub-platform. According to the gas data transmission method based on the compound IoT and the IoT system provided by the present invention, the stability, continuity, reliability and effectiveness of the gas data transmission can be guaranteed.

To make the above objectives, characteristics and advantages of the present invention more apparent and understandable, preferred embodiments are set forth hereinafter and are described below in detail in combination with accompanying drawings.

BRIEF DESCRIPTION OF DRAWINGS

To make the objectives, technical solutions and advantages of the embodiments of the present invention clearer, a clear and complete description of the technical solutions in the present invention will be given below in combination with the accompanying drawings in the embodiments of the present invention. Apparently, the embodiments described below are a part, but not all, of the embodiments of the present invention. Generally, a component, described and illustrated in the accompanying drawings, in the embodiments of the present invention may be disposed and designed in various different configurations. Therefore, the following detailed description concerning the embodiments of the present invention and provided in the accompanying drawings is not intended to limit a claimed scope of the present invention, but merely represents selected embodiments of the present invention. All of the other embodiments, obtained by a person of ordinary skill in the art based on the embodiments of the present invention without any inventive efforts, fall into the protection scope of the present invention.

Figure 1:
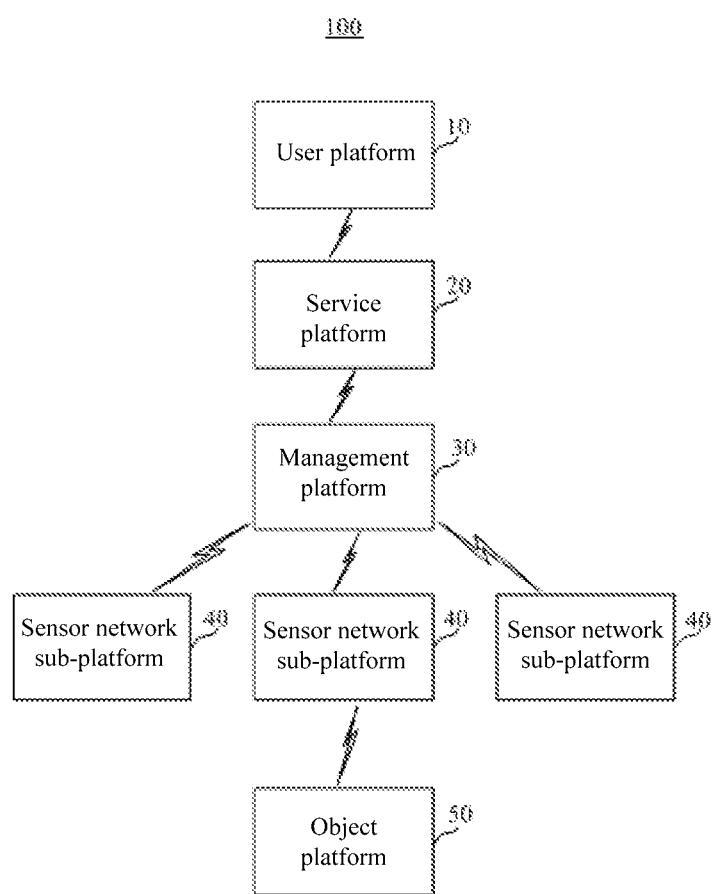
FIG. 1 illustrates a compositional schematic diagram of an IoT system provided by an embodiment of the present invention.

Numerals in the drawings: 100—IoT system; 10—user platform; 20—service platform; 30—management service platform; 40—sensor network sub-platform; 50—object sub-platform.

DESCRIPTION OF EMBODIMENTS

A clear and complete description of the technical solutions in the present invention will be given below in combination with the accompanying drawings in the embodiments of the present invention. Apparently, the embodiments described below are a part, but not all, of the embodiments of the present invention. Generally, a component, described and illustrated in the accompanying drawings, in the embodiments of the present invention may be disposed and designed in various different configurations. Therefore, the following detailed description concerning the embodiments of the present invention and provided in the accompanying drawings is not intended to limit a claimed scope of the present invention, but merely represents selected embodiments of the present invention. All of the other embodiments, obtained by those skilled in the art based on the embodiments of the present invention without any inventive efforts, fall into the protection scope of the present invention.

Referring to FIG. 1, a gas data transmission method based on a compound IoT provided by an embodiment of the present invention is applied to an IoT system 100. The IoT system 100 includes a user platform 10, a service platform 20, a management platform 30, a plurality of sensor network sub-platforms 40, and an object platform 50. Herein, the object platform 50 includes a gas meter, and may be communicatively connected with the management platform 30 via the sensor network sub-platforms 40 to send data of the object platform 50 to the management platform 30, or receive a signal sent by the management platform 30. The management platform 30 is communicatively connected with the service platform 20. In this embodiment, the service platform 20 is a gas company service platform; and the service platform 20 is communicatively connected with the user platform 10 and is configured to push information sent by the management platform 30 to the user platform 10. The management platform 30 and the service platform 20 each may be a server. The user platform 10 may be a universal electronic device such as a Personal Computer (PC), a smartphone, a tablet computer, a Personal Digital Assistant (PDA), a Mobile Internet Device (MID), and the like.

Figure 2:
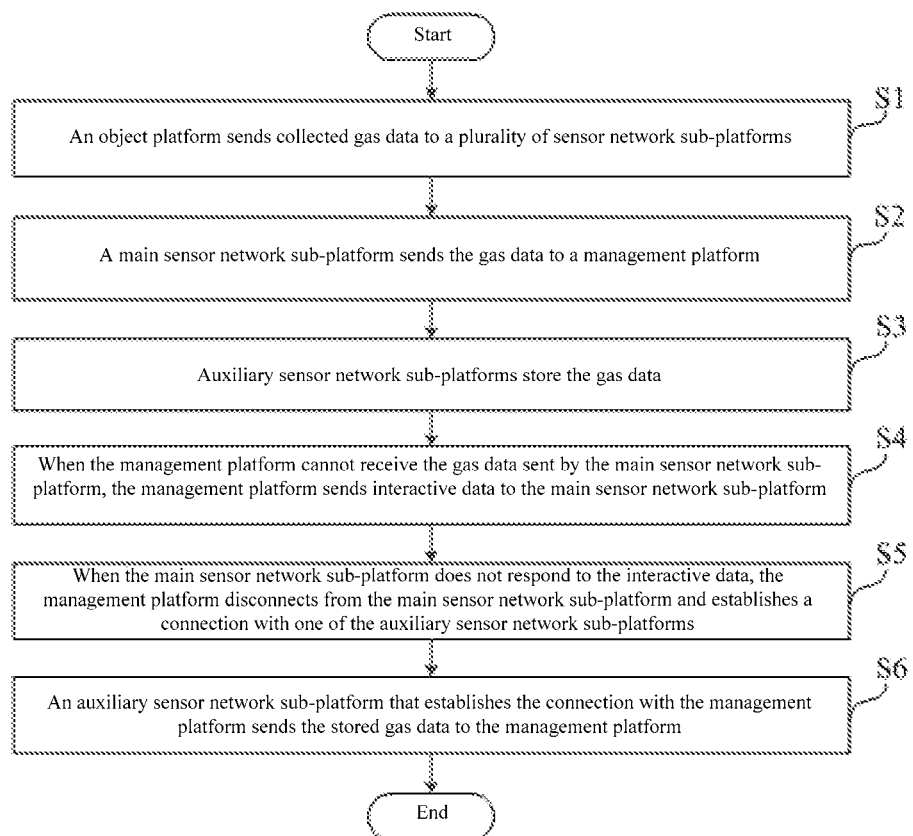
FIG. 2 illustrates a flowchart of a gas data transmission method based on a compound IoT provided by an embodiment of the present invention.

Referring to FIG. 2, the gas data transmission method based on the compound IoT includes the following steps:

Step S1, an object platform sends collected gas data to a plurality of sensor network sub-platforms.

In this embodiment, the sensor network sub-platforms 40 each may be a gateway; and gas data collected by the object platform 50 is sent to each of the sensor network sub-platforms 40.

Step S2, a main sensor network sub-platform sends the gas data to a management platform.

In this embodiment of the present invention, the IoT system 100 includes the plurality of sensor network sub-platforms 40. It is easily understood that the plurality of sensor network sub-platforms 40 do not simultaneously send the received gas data to the management platform 30 to cause the energy waste, enable the management platform 30 to process more repeated data and increase the computation burden. Therefore, although the plurality of sensor network sub-platforms 40 receive the gas data, the data is transmitted only via the main sensor network sub-platform therein. It is to be noted that, in this embodiment of the present invention, the structures of the main sensor network sub-platform and auxiliary sensor network sub-platforms may be the same and may also be different. It may be understood that the sensor network sub-platform 40 that transmits the data to the management platform 30 is the main sensor network sub-platform and the rest are the auxiliary sensor network sub-platforms. Each of the sensor network sub-platforms 40 has a data sending cycle, and sends the gas data to the management platform 30 according to the data sending cycle. Preferably, the data sending cycle of each of the sensor network sub-platforms 40 is the same.

Step S3, auxiliary sensor network sub-platforms store the gas data.

Each of the auxiliary sensor network sub-platforms does not send the gas data to the management platform 30 but stores the gas data. It is to be noted that each of the auxiliary sensor network sub-platforms does not store the gas data permanently, but stores the gas data for a certain time and then deletes the gas data. The storage time may be set freely, but cannot be shorter than the data sending cycle of the main sensor network sub-platform. Preferably, the time that each of the auxiliary sensor network sub-platforms stores the gas data is the cycle; and after the storage time expires, each of the auxiliary sensor network sub-platforms deletes the stored gas data.

Step S4, when the management platform cannot receive the gas data sent by the main sensor network sub-platform, the management platform sends interactive data to the main sensor network sub-platform.

If the management platform 30 cannot receive the gas data sent by the main sensor network sub-platform, it may because that the main sensor network sub-platform is delayed, or the main sensor network sub-platform and the management platform 30 are not synchronized in time, and thus the gas data is not received by the management platform 30 in time. It is also possible that the main sensor network sub-platform is faulty or is damaged. In order to verify whether or not the main sensor network sub-platform is faulty and cannot communicate, the management platform 30 sends interactive data to the main sensor network sub-platform, and requests to perform data interaction with the main sensor network sub-platform.

Step S5, when the main sensor network sub-platform does not respond to the interactive data, the management platform disconnects from the main sensor network sub-platform and establishes a connection with one of the auxiliary sensor network sub-platforms.

If the main sensor network sub-platform does not respond to the interactive data, it may be judged that the main sensor network sub-platform is faulty to lose the ability of data interaction. At this moment, in order to ensure the continuity and stability of gas data transmission, the main sensor network sub-platform disconnects from the management platform 30. Instead, an auxiliary sensor network sub-platform is connected. It is easily understood that the management platform 30 is connected with one of the plurality of auxiliary sensor network sub-platforms.

Step S6, an auxiliary sensor network sub-platform that establishes the connection with the management platform sends the stored gas data to the management platform.

The auxiliary sensor network sub-platform sends the stored gas data to the management platform 30 to guarantee the continuity and integrity of the gas data.

Through the above steps, according to the gas data transmission method based on the compound IoT provided by this embodiment of the present invention, when a sensor network sub-platform 40 is faulty and cannot transmit data, gas data is transmitted via an auxiliary sensor network sub-platform, thereby ensuring the continuity and integrity of gas data transmission.

Figure 3:
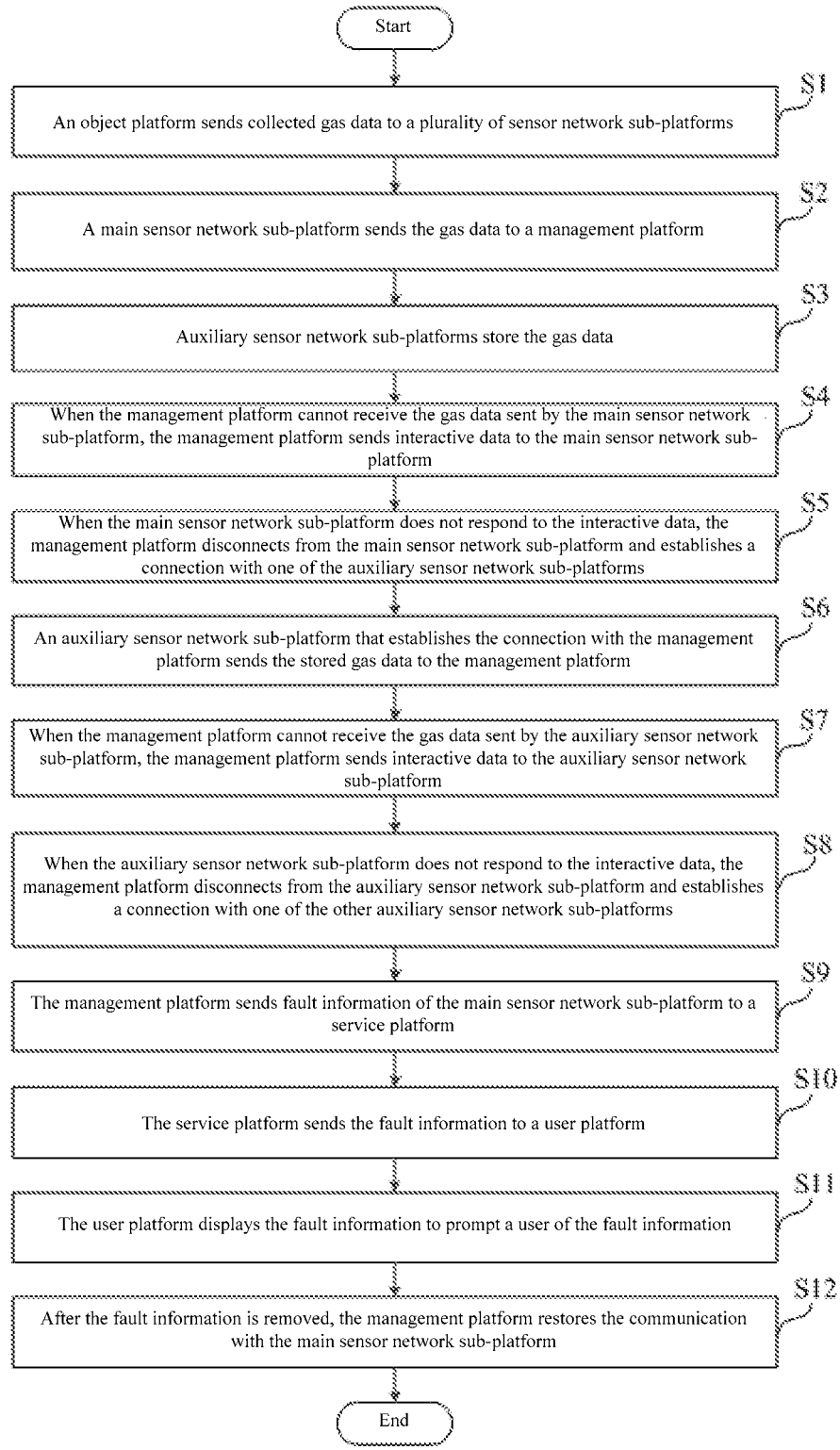
FIG. 3 illustrates a flowchart of a gas data transmission method based on a compound IoT provided by an embodiment of the present invention.

In addition, referring to FIG. 3, the gas data transmission method based on the compound IoT provided by this embodiment of the present invention may further include the following steps:

Step S7, when the management platform cannot receive the gas data sent by the auxiliary sensor network sub-platform, the management platform sends interactive data to the auxiliary sensor network sub-platform.

Step S8, when the auxiliary sensor network sub-platform does not respond to the interactive data, the management platform disconnects from the auxiliary sensor network sub-platform and establishes a connection with one of the other auxiliary sensor network sub-platforms to obtain the gas data conveniently.

When the auxiliary sensor network sub-platform is also faulty, the management platform 30 changes another auxiliary sensor network sub-platform to transmit the gas data.

Step S9, the management platform sends fault information of the main sensor network sub-platform to a service platform.

When the main sensor network sub-platform is faulty, in order to facilitate the maintenance of the faulty main sensor network sub-platform, the management platform 30 sends the fault information to the service platform 20. It is to be noted that the above-mentioned main sensor network sub-platform is the platform sending the gas data to the management platform 30. When the management platform 30 is switched to an auxiliary sensor network sub-platform to transmit the data, the switched sensor network sub-platform 40 is equivalent to the main sensor network sub-platform.

Step S10, the service platform sends the fault information to a user platform.

Step S11, the user platform displays the fault information to prompt a user of the fault information.

The service platform 20 may send the fault information to the user platform 10 by pushing a short message or an application program message and the like, and the pushed information content may be to inform the user of the fault information and inquire about the time when the fault is maintained by the user.

Step S12, after the fault information is removed, the management platform restores the communication with the main sensor network sub-platform.

In conclusion, the embodiment of the present invention provides a gas data transmission method based on a compound IoT and an IoT system. The method is applied to the IoT system. The IoT system includes a user platform, a service platform, a management platform, a plurality of sensor network sub-platforms, and an object platform; the object platform includes a gas meter; the plurality of sensor network sub-platforms include a main sensor network sub-platform and at least one auxiliary sensor network sub-platform; the main sensor network sub-platform in the plurality of sensor network sub-platforms is configured to send gas data to the management platform; the auxiliary sensor network sub-platforms are configured to store the gas data; when the management platform cannot receive the gas data sent by the main sensor network sub-platform, the management platform sends interactive data to the main sensor network sub-platform; and when the main sensor network sub-platform does not respond to the interactive data, the management platform disconnects from the main sensor network sub-platform and establishes a connection with one auxiliary sensor network sub-platform to receive the gas data stored by the auxiliary sensor network sub-platform. According to the gas data transmission method based on the compound IoT and the IoT system provided by the present invention, the stability, continuity, completeness, reliability and effectiveness of the gas data transmission can be guaranteed.

What is claimed is:

1. A data transmission method for an smart gas service system based on compound IoT, comprising:
    sending, by an object platform, collected gas data to a plurality of sensor network sub-platforms;
    sending, by a main sensor network sub-platform, the gas data to a management platform;
    storing, by auxiliary sensor network sub-platforms, the gas data,
    wherein each of the auxiliary sensor network sub-platforms stores the gas data for predetermined time and after the predetermined time, each of the auxiliary sensor network sub-platforms deletes the gas data,
    when the management platform cannot receive the gas data sent by the main sensor network sub-platform, sending, by the management platform, interactive data to the main sensor network sub-platform.

2. The gas data transmission method according to claim 1, further comprising:
    when the main sensor network sub-platform does not respond to the interactive data, disconnecting, by the management platform, from the main sensor network sub-platform and establishing a connection with one of the auxiliary sensor network sub-platforms.

3. The gas data transmission method according to claim 2, further comprising:
    sending, by an auxiliary sensor network sub-platform that establishes the connection with the management platform, the stored gas data to the management platform.

4. The gas data transmission method according to claim 3, wherein a cycle that each of the plurality of sensor network sub-platforms sends the gas data is the same, and the predetermined time is the cycle.

5. The gas data transmission method according to claim 3, wherein the method further comprises:
    when the management platform cannot receive the gas data sent by the auxiliary sensor network sub-platform, sending, by the management platform, interactive data to the auxiliary sensor network sub-platform; and when the auxiliary sensor network sub-platform does not respond to the interactive data, disconnecting, by the management platform, from the auxiliary sensor network sub-platform and establishing a connection with one of the other auxiliary sensor network sub-platforms to obtain the gas data conveniently.

6. The gas data transmission method according to claim 3, further comprising:
    sending, by the management platform, fault information of the main sensor network sub-platform to the service platform;
    sending, by the service platform, the fault information to the user platform;
    displaying, by the user platform, the fault information to prompt a user; and
    after the fault information is removed, restoring, by the management platform, the communication with the main sensor network sub-platform.

7. An Internet of Things (IoT) system, comprising:
    an object platform, configured to send collected gas data to a plurality of sensor network sub-platforms;
    a main sensor network sub-platform, configured to send the gas data to a management platform;
    auxiliary sensor network sub-platforms configured to store the gas data,
    wherein each of the auxiliary sensor network sub-platforms is configured to store the gas data for predetermined time and after the predetermined time, each of the auxiliary sensor network sub-platforms deletes the gas data,
    wherein when the management platform cannot receive the gas data sent by the main sensor network sub-platform, the management platform sends interactive data to the main sensor network sub-platform.

8. The IoT system according to claim 7, wherein
    when the main sensor network sub-platform does not respond to the interactive data, the management platform disconnects from the main sensor network sub-platform and establishes a connection with one of the auxiliary sensor network sub-platforms.

9. The IoT system according to claim 8, wherein an auxiliary sensor network sub-platform that establishes the connection with the management platform sends the stored gas data to the management platform.

10. The IoT system according to claim 9, wherein a cycle that each of the plurality of sensor network sub-platforms sends the gas data is the same, and the predetermined time is the cycle.

11. The IoT system according to claim 9, wherein when the management platform cannot receive the gas data sent by the auxiliary sensor network sub-platform, the management platform is configured to send interactive data to the auxiliary sensor network sub-platform; and when the auxiliary sensor network sub-platform does not respond to the interactive data, the management platform disconnects from the auxiliary sensor network sub-platform and establishes a connection with one of the other auxiliary sensor network sub-platforms to obtain the gas data conveniently.

12. The IoT system according to claim 9, wherein the management platform is further configured to send fault information of the main sensor network sub-platform to the service platform;
    the service platform is configured to send the fault information to the user platform;
    the user platform is configured to display the fault information to prompt a user of the fault information; and
    after the fault information is removed, the management platform restores the communication with the main sensor network sub-platform.

* * * * *